United States Patent
Uraguchi et al.

(10) Patent No.: US 10,207,775 B2
(45) Date of Patent: Feb. 19, 2019

(54) DOUBLE-SHELL TANK AND LIQUEFIED GAS CARRIER SHIP

(71) Applicant: KAWASAKI JUKOGYO KABUSHIKI KAISHA, Kobe-shi, Hyogo (JP)

(72) Inventors: Ryosuke Uraguchi, Akashi (JP); Asako Murakami, Kobe (JP); Naruyoshi Izumi, Kobe (JP); Atsushi Sano, Kakogawa (JP); Osamu Muragishi, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 449 days.

(21) Appl. No.: 14/899,574

(22) PCT Filed: May 30, 2014

(86) PCT No.: PCT/JP2014/002874
§ 371 (c)(1),
(2) Date: Dec. 18, 2015

(87) PCT Pub. No.: WO2014/203470
PCT Pub. Date: Dec. 24, 2014

(65) Prior Publication Data
US 2016/0137272 A1 May 19, 2016

(30) Foreign Application Priority Data
Jun. 19, 2013 (JP) .................................. 2013-128847

(51) Int. Cl.
B63B 25/16 (2006.01)
F17C 1/00 (2006.01)
F17C 3/02 (2006.01)

(52) U.S. Cl.
CPC .............. *B63B 25/16* (2013.01); *F17C 1/002* (2013.01); *F17C 3/025* (2013.01);
(Continued)

(58) Field of Classification Search
CPC ...... F17C 3/025; F17C 3/08; F17C 2201/035; F17C 2201/0391; F17C 2203/0391;
(Continued)

(56) References Cited

U.S. PATENT DOCUMENTS 3,067,713 A * 12/1962 Meesen .................. B63B 25/12
114/74 A
3,166,915 A 1/1965 Klipping
(Continued)

FOREIGN PATENT DOCUMENTS

CN 2366675 Y 3/2000
EP 0 188 389 A2 7/1986
(Continued)

OTHER PUBLICATIONS

Jan. 18, 2017 European Search Report issued in European Application No. 14814095.7.
(Continued)

*Primary Examiner* — Robert Poon
(74) *Attorney, Agent, or Firm* — Oliff PLC

(57) ABSTRACT

A horizontal type cylindrical double-shell tank includes an inner shell and an outer shell. The inner shell includes an inner shell main part storing a liquefied gas and an inner shell dome protruding from the inner shell main part. The outer shell forms a vacuum space between the inner shell and the outer shell, and includes an outer shell main part surrounding the inner shell main part and an outer shell dome surrounding the inner shell dome. The inner shell dome is provided with an inner shell manhole. The outer shell dome is provided with an outer shell manhole at a (Continued)

position corresponding to a position of the inner shell manhole.

9 Claims, 5 Drawing Sheets

(52) U.S. Cl.
CPC ............... *F17C 2201/0109* (2013.01); *F17C 2201/035* (2013.01); *F17C 2201/052* (2013.01); *F17C 2203/018* (2013.01); *F17C 2203/0379* (2013.01); *F17C 2203/0629* (2013.01); *F17C 2205/0352* (2013.01); *F17C 2205/0379* (2013.01); *F17C 2221/012* (2013.01); *F17C 2221/033* (2013.01); *F17C 2221/035* (2013.01); *F17C 2223/0153* (2013.01); *F17C 2223/0161* (2013.01); *F17C 2223/033* (2013.01); *F17C 2270/0105* (2013.01); *Y02E 60/321* (2013.01)

(58) Field of Classification Search
CPC ...... F17C 2203/0379; F17C 2203/0629; F17C 2205/0379; F17C 2270/0105
USPC ............... 220/560.11, 560.1, 560.12, 560.04
See application file for complete search history.

(56) References Cited

U.S. PATENT DOCUMENTS

| | | | | | |
|---|---|---|---|---|---|
| 3,191,795 | A | * | 6/1965 | Molnar | F17C 13/086 220/560.1 |
| 3,312,076 | A | * | 4/1967 | Clarke | B63B 25/16 62/45.1 |
| 3,341,049 | A | * | 9/1967 | Forman | F17C 3/025 114/74 A |
| 3,347,402 | A | * | 10/1967 | Forman | F17C 13/082 114/74 A |
| 3,698,589 | A | * | 10/1972 | Perry | A47J 41/02 220/560.1 |
| 3,851,611 | A | * | 12/1974 | Yamamoto | F17C 3/025 114/74 A |
| 3,968,764 | A | * | 7/1976 | Kvamsdal | B63B 25/16 114/74 A |
| 4,120,421 | A | * | 10/1978 | Prost | F17C 3/08 220/560.1 |
| 4,496,073 | A | * | 1/1985 | Silver | F17C 13/086 220/560.11 |
| 4,821,907 | A | * | 4/1989 | Castles | F17C 13/008 206/0.7 |
| 7,448,511 | B2 | * | 11/2008 | Schippl | F17C 3/08 220/560.04 |
| 2014/0263355 | A1 | * | 9/2014 | Verhulst | F17C 13/001 220/560.1 |

FOREIGN PATENT DOCUMENTS

| | | |
|---|---|---|
| FR | 2005111 A1 | 12/1969 |
| GB | 980188 A | 1/1965 |
| GB | 1125719 A | 8/1968 |
| JP | S51-30290 B1 | 8/1976 |
| JP | S52-151968 A | 12/1977 |
| JP | S52-151968 U | 5/1979 |
| JP | S58-17296 A | 2/1983 |
| JP | S62-147800 U | 9/1987 |
| JP | S63-259298 A | 10/1988 |
| JP | H06-159593 A | 6/1994 |
| JP | H07-232695 A | 9/1995 |
| JP | H08-295394 A | 11/1996 |
| JP | 2014-118206 A | 6/2014 |
| KR | 10-0748644 B1 | 8/2007 |
| KR | 2013-0023494 A | 3/2013 |

OTHER PUBLICATIONS

Aug. 19, 2014 International Search Report issued in International Patent Application No. PCT/JP2014/002874.

Dec. 22, 2015 International Preliminary Report on Patentability issued in International Patent Application No. PCT/JP2014/002874.

Sep. 20, 2016 Office Action issued in Japanese Patent Application No. 2013-128847.

Jul. 12, 2016 Office Action issued in Chinese Patent Application No. 2014800319585.

\* cited by examiner

DOUBLE-SHELL TANK AND LIQUEFIED GAS CARRIER SHIP

TECHNICAL FIELD

The present invention relates to a double-shell tank used for transporting and storing a liquefied gas and to a liquefied gas carrier ship including the double-shell tank.

BACKGROUND ART

One example of a known double-shell tank used for transporting and storing a liquefied gas is a horizontal type cylindrical double-shell tank disclosed in Patent Literature 1. The double-shell tank includes an inner shell and an outer shell. The inner shell stores the liquefied gas. The outer shell forms a vacuum space as a thermal insulating layer between the inner shell and the outer shell.

CITATION LIST

Patent Literature

PTL 1: Japanese Laid-Open Patent Application Publication No. H06-159593

SUMMARY OF INVENTION

Technical Problem

In some cases, in the above-described double-shell tank, a submerged pump for discharging the liquefied gas from the inside of the tank to the outside is disposed at the inner bottom of the inner shell, and also, the inner shell may be provided with an inner shell dome for putting various pipes penetrating the inner shell, such as a liquefied gas pipe and an electric wire pipe, into one place. For example, the inner shell dome is formed to protrude upward from the inner shell main part, which stores the liquefied gas. In this case, the outer shell is provided with an outer shell dome, which surrounds the inner shell dome in a non-contacting manner, such that the inner shell dome is entirely covered by a vacuum space. This structure makes it possible to suppress the entry of heat from the outside of the tank into the inner shell even at a portion where the inner shell dome is provided. Various pipes, such as a liquefied gas pipe and an electric wire pipe, are disposed in a manner to penetrate the inner shell dome and the outer shell dome.

The double-shell tank, which includes internal devices such as a pump, needs to be provided with manholes so that the internal devices of the tank, such as a pump, can be inspected. In a case where the double-shell tank is provided with such manholes, it is conceivable to dispose the domes and the manholes away from each other since a large number of pipes are disposed near the domes. For example, it is conceivable to form the inner shell dome and the outer shell dome at one end of the tank in its axial direction, and form an inner shell manhole and an outer shell manhole at the other end of the tank in the axial direction.

Further, in the case where the manholes are provided, it is conceivable to form the manhole-provided area of the tank to have a double-pipe structure similar to the dome-provided area of the tank, such that the double pipes do not contact each other, from the viewpoint of suppressing the entry of heat from the outside of the tank into the inner shell through the manhole-provided portions. Specifically, an inner shell manhole pipe defining the inner shell manhole is mounted to the inner shell, and an outer shell manhole pipe defining the outer shell manhole and capable of accommodating the entire inner shell manhole pipe therein is mounted to the outer shell. Manhole covers are fixed to the manhole pipes, respectively.

Since the liquefied gas stored in the inner shell is a low-temperature liquefied gas, when the liquefied gas is fed into the inner shell, thermal contraction of the inner shell occurs. Meanwhile, the temperature of the outer shell is substantially the same as the atmospheric temperature even when the liquefied gas is fed into the inner shell, because there is the vacuum space between the outer shell and the inner shell. Therefore, in a structure in which the inner and outer shells are provided with the respective domes and the manhole pipes are mounted to the inner and outer shells as described above, the distance from the outer shell dome to the outer shell manhole pipe hardly changes, whereas the distance from the inner shell dome to the inner shell manhole pipe changes greatly. Consequently, for example, if the inner shell dome and the outer shell dome are fixed, there is a risk that the inner shell manhole pipe may come into contact with the outer shell manhole pipe. It is conceivable to fix not only the inner shell dome and the outer shell dome but also the inner shell manhole pipe and the outer shell manhole pipe. In this case, however, thermal stress occurs to the inner shell.

In view of the above, an object of the present invention is to provide a double-shell tank capable of restricting the positions of the inner shell dome and the outer shell dome relative to each other and the positions of the inner shell manhole and the outer shell manhole relative to each other without causing the thermal stress to the inner shell, and to provide a liquefied gas carrier ship including the double-shell tank.

Solution to Problem

In order to solve the above-described problems, a double-shell tank according to the present invention, which is a horizontal type cylindrical double-shell tank, includes: an inner shell including an inner shell main part storing a liquefied gas and an inner shell dome protruding from the inner shell main part; and an outer shell forming a vacuum space between the inner shell and the outer shell, the outer shell including an outer shell main part surrounding the inner shell main part and an outer shell dome surrounding the inner shell dome. The inner shell dome is provided with an inner shell manhole. The outer shell dome is provided with an outer shell manhole at a position corresponding to a position of the inner shell manhole.

According to the above configuration, the inner shell dome is provided with the inner shell manhole, and the outer shell dome is provided with the outer shell manhole. Accordingly, if the positions of the inner shell dome and the outer shell dome relative to each other are restricted, then the positions of the inner shell manhole and the outer shell manhole relative to each other are also restricted. Moreover, since such restriction can be realized at one position, thermal stress to the inner shell can be prevented from occurring when thermal contraction of the inner shell occurs. Furthermore, when the inner shell manhole is opened, a part of the pipe, the part being positioned inside the inner shell dome, can be visually checked, and thereby regular inspection of the inside of the inner shell can be performed efficiently.

The double-shell tank may include an annular blocking member disposed between the inner shell dome and the outer shell dome, the blocking member dividing the vacuum space into a first space and a second space, the first space including a space between the inner shell manhole and the outer shell manhole, the second space being positioned at the inner shell main part side. According to this configuration, when the outer shell manhole is opened, only the first space, which is a small part of the vacuum space, becomes open to the atmosphere. Therefore, the volume of the space that needs to be made vacuum again after closing the outer shell manhole can be reduced.

The blocking member may be disposed at the inner shell main part side as seen from a position where the inner shell dome and the outer shell dome are penetrated by a pipe. According to this configuration, a part of the pipe, the part being positioned between the inner shell dome and the outer shell dome, can be inspected when the outer shell manhole is opened.

An outer side surface of the inner shell dome may be provided with a first ring protruding from the outer side surface. An inner side surface of the outer shell dome may be provided with a second ring protruding from the inner side surface. The blocking member may be disposed in a manner to bridge between the first ring and the second ring. This configuration allows the blocking member to have a simple shape.

For example, the first ring and the second ring may be plate-shaped members, which are flattened in a particular direction, the particular direction defining a protruding direction of the inner shell dome, and which face each other in the particular direction, and the blocking member may be a bellows pipe extending in the particular direction.

The above double-shell tank may include a thermal-insulating material, which covers a part of the pipe penetrating the inner shell dome and the outer shell dome, the part being positioned between the inner shell dome and the outer shell dome. This configuration makes it possible to suppress the entry of heat from the outside of the tank into the inner shell through the pipe.

A liquefied gas carrier ship according to the present invention includes the above-described double-shell tank.

The above liquefied gas carrier ship may include a tank cover covering the double-shell tank, and an inert gas may be enclosed in a space between the double-shell tank and the tank cover. According to this configuration, in a case where the liquefied gas is, for example, ultracold liquefied hydrogen, liquefied oxygen can be prevented from being generated around tank-supporting units, which are greatly affected by heat from the inner shell.

For example, the tank cover may be provided with an outermost manhole at a position corresponding to the position of the outer shell manhole.

Advantageous Effects of Invention

According to the present invention, the positions of the inner shell dome and the outer shell dome relative to each other and the positions of the inner shell manhole and the outer shell manhole relative to each other can be restricted without causing thermal stress to the inner shell.

DESCRIPTION OF EMBODIMENTS

Figure 1:
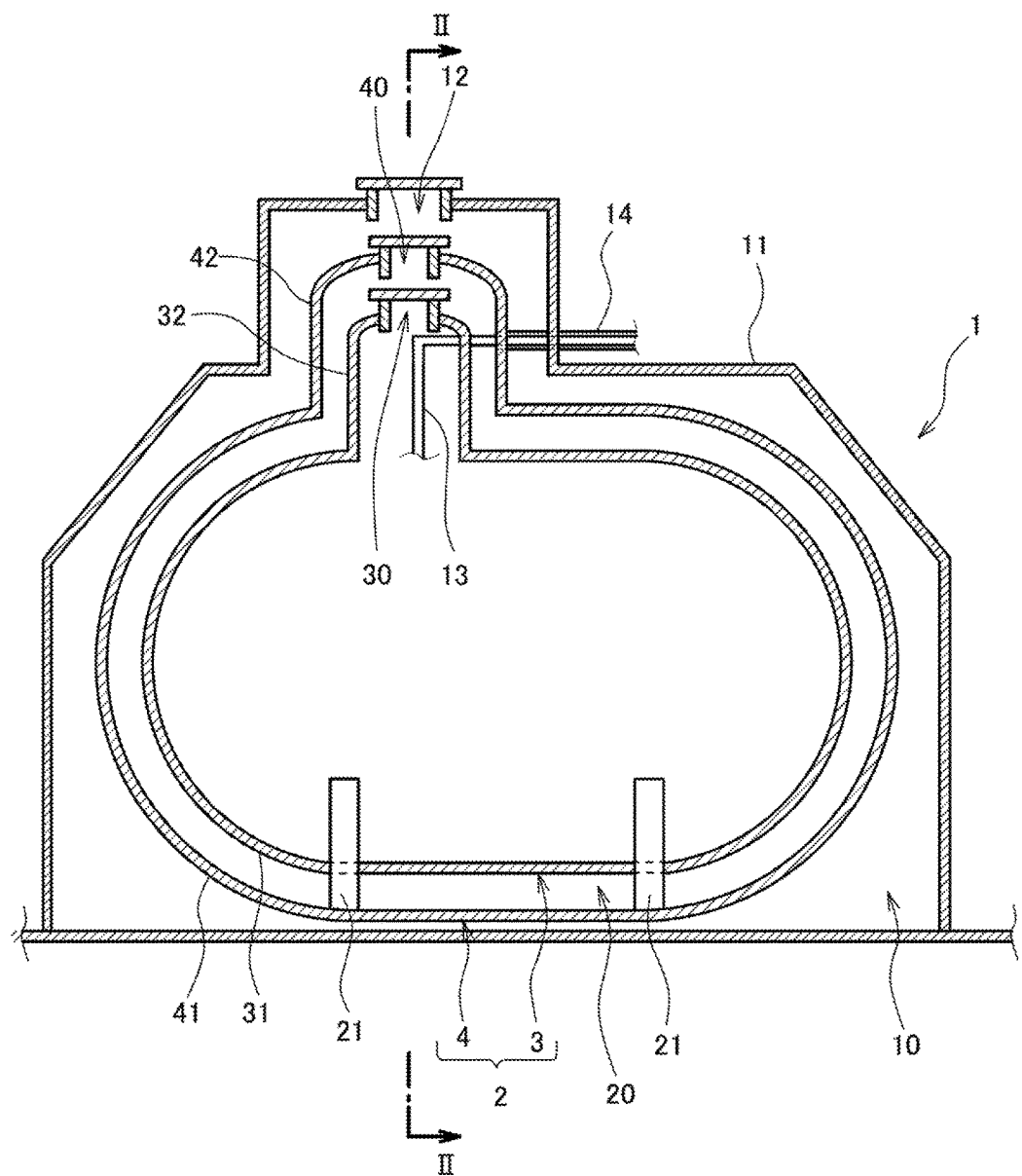
FIG. 1 is a sectional side view of a part of a liquefied gas carrier ship, on which a double-shell tank according to one embodiment of the present invention is mounted.
Figure 2:
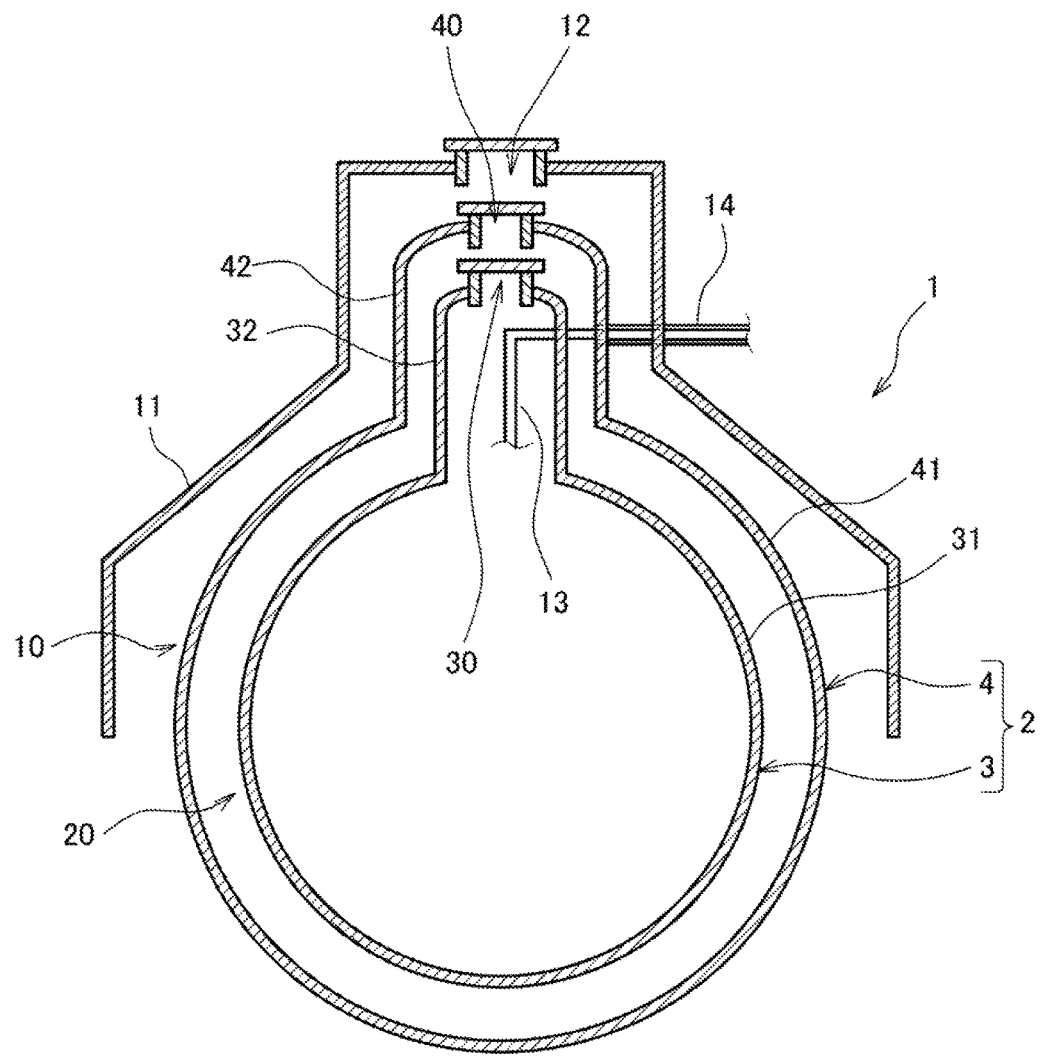
FIG. 2 is a sectional front view taken along a line II-II of FIG. 1.

FIG. 1 and FIG. 2 each show a part of a liquefied gas carrier ship 1, on which a double-shell tank 2 according to one embodiment of the present invention is mounted.

The double-shell tank 2 is a horizontal type cylindrical tank. In general, the double-shell tank 2 is disposed such that the axial direction of the tank 2 is parallel to the ship length direction. Specifically, the double-shell tank 2 includes an inner shell 3 and an outer shell 4. The outer shell 4 forms a vacuum space 20 between the inner shell 3 and the outer shell 4.

The inner shell 3 includes an inner shell main part 31 storing a liquefied gas and an inner shell dome 32 protruding in a particular direction from the inner shell main part 31. In the present embodiment, the particular direction is the vertical direction, and the inner shell dome 32 protrudes upward from the inner shell main part 31. The particular direction, which defines the protruding direction of the inner shell dome 32, may alternatively be a diagonal direction.

The inner shell main part 31 includes: a body portion extending laterally with a constant cross-sectional shape; and hemispherical sealing portions sealing openings on both sides of the body portion. Alternatively, each sealing portion may have a flat shape perpendicular to the body portion or may be dish-shaped.

For example, the liquefied gas stored in the inner shell main part 31 is liquefied petroleum gas (LPG, about −45° C.), liquefied ethylene gas (LEG, about −100° C.), liquefied natural gas (LNG, about −160° C.), or liquefied hydrogen ($LH_2$, about −250° C.).

Figure 3:
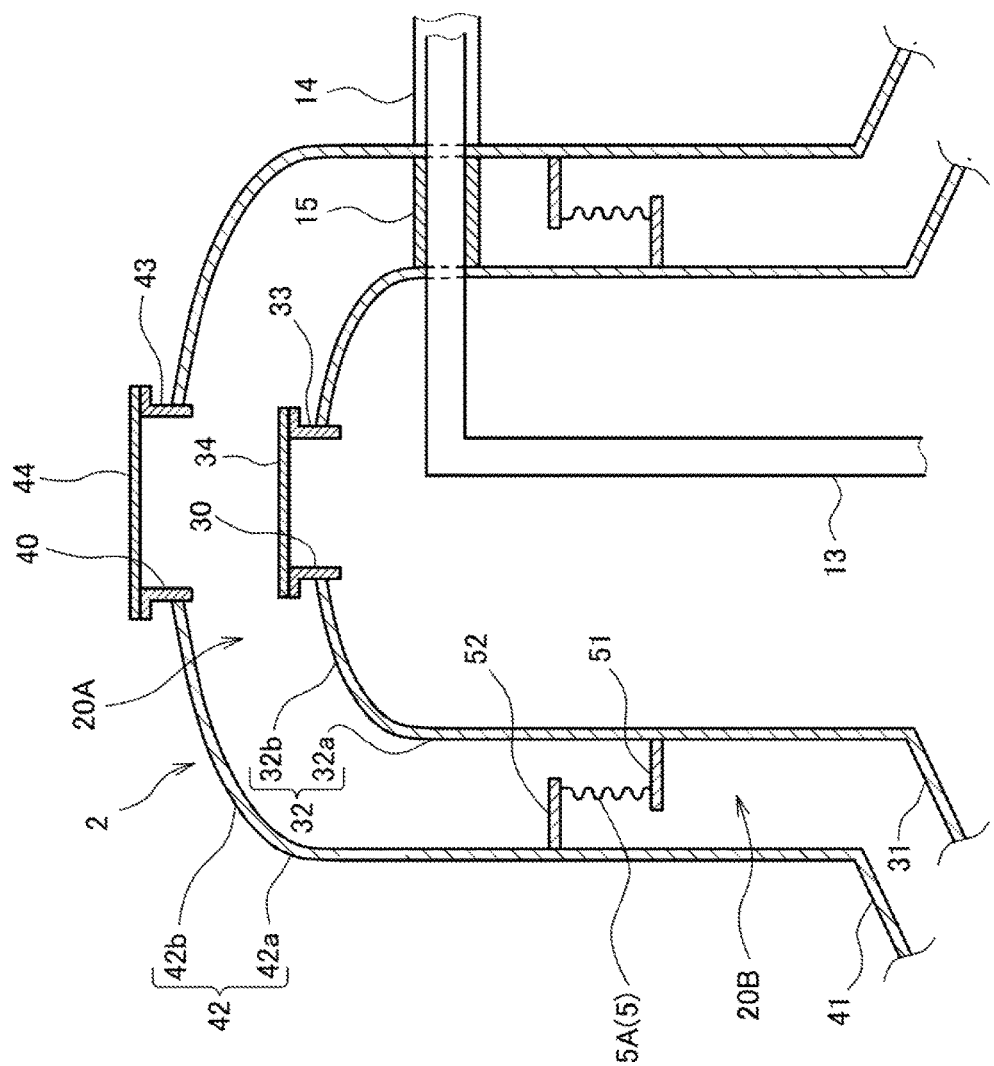
FIG. 3 is a sectional front view of an essential part of the double-shell tank.

As shown in FIG. 3, the inner shell dome 32 includes: a peripheral wall 32a extending upward from the inner shell main part 31; and a dish-shaped ceiling wall 32b, which is raised upward from the upper end of the peripheral wall 32a. The ceiling wall 32b may have a different shape, for example, a hemispherical shape.

The outer shell 4 includes an outer shell main part 41 surrounding the inner shell main part 31 and an outer shell dome 42 surrounding the inner shell dome 32. That is, the outer shell main part 41 has the shape of the inner shell main part 31, but is larger than the inner shell main part 31, and the outer shell dome 42 has the shape of the inner shell dome 32, but is larger than the inner shell dome 32.

The outer shell dome 42 includes: a peripheral wall 42a extending upward from the outer shell main part 41; and a dish-shaped ceiling wall 42b, which is raised upward from the upper end of the peripheral wall 42a. The ceiling wall 42b may have a different shape, for example, a hemispherical shape.

The outer shell main part 41 is, for example, supported by saddles (not shown) provided on a hull. A pair of support mechanisms 21 (see FIG. 1) is disposed between the inner shell main part 31 and the outer shell main part 41. The support mechanisms 21 support the inner shell main part 31 at respective positions that are spaced apart from each other in the axial direction of the tank 2. It should be noted that, from the viewpoint of suppressing the entry of heat from the outside of the tank 2 into the inner shell 3, it is preferable that the area of contact between the inner shell main part 31 and the support mechanisms 21 be small. For example, it is desirable that both the support mechanisms 21 have a hollow structure.

A submerged pump (not shown) for discharging the liquefied gas from the inside of the tank 2 to the outside is disposed at the inner bottom of the inner shell 3. The double-shell tank 2 is provided with various pipes 13, such as a liquefied gas pipe and an electric wire pipe. The pipes 13 penetrate the inner shell dome 32 and the outer shell dome 42. It should be noted that each of FIG. 1 and FIG. 2 shows only one pipe that represents the pipes 13.

In the present embodiment, each pipe 13 penetrates the peripheral wall 32*a* of the inner shell dome 32 and the peripheral wall 42*a* of the outer shell dome 42. However, each pipe 13 may be bent between the inner shell dome 32 and the outer shell dome 42 by 90 degrees to penetrate the peripheral wall 32*a* of the inner shell dome 32 and the ceiling wall 42*b* of the outer shell dome 42 or to penetrate the ceiling wall 32*b* of the inner shell dome 32 and the peripheral wall 42*a* of the outer shell dome 42.

A thermal-insulating material 15 covers a part of each pipe 13, the part being positioned between the inner shell dome 32 and the outer shell dome 42. This makes it possible to suppress the entry of heat from the outside of the tank 2 into the inner shell 3 through the pipes 13. Outside the outer shell 4, each pipe 13 is accommodated in a vacuum pipe 14, and thereby heat transfer from the atmosphere to the pipes 13 is suppressed.

The ceiling wall 32*b* of the inner shell dome 32 is provided with an inner shell manhole 30 so that the submerged pump disposed in the inner shell 3 can be inspected. The ceiling wall 42*b* of the outer shell dome 42 is provided with an outer shell manhole 40 at a position corresponding to the position of the inner shell manhole 30. Specifically, an inner shell manhole pipe 33, which defines the inner shell manhole 30, is mounted to the ceiling wall 32*b* of the inner shell dome 32, and an outer shell manhole pipe 43, which defines the outer shell manhole 40, is mounted to the ceiling wall 42*b* of the outer shell dome 42. Manhole covers 34 and 44 are fixed to flanges provided at the upper ends of the manhole pipes 33 and 43. It should be noted that the position where the inner shell manhole 30 is provided may be the center of the ceiling wall 32*b* or may be a position displaced from the center of the ceiling wall 32*b*.

Returning to FIG. 1 and FIG. 2, the liquefied gas carrier ship 1 includes a tank cover 11 covering the double-shell tank 2. A space 10 between the double-shell tank 2 and the tank cover 11 may be filled with air. However, desirably, an inert gas is enclosed in the space 10. Examples of the inert gas include nitrogen and argon. By enclosing such an inert gas, in a case where the liquefied gas is, for example, ultracold liquefied hydrogen, liquefied oxygen can be prevented from being generated around tank-supporting units (e.g., the aforementioned saddles), which are greatly affected by heat from the inner shell 3. The tank cover 11 is provided with an outermost manhole 12 at a position corresponding to the position of the outer shell manhole 40.

From the viewpoint of restricting the positions of the inner shell dome 32 and the outer shell dome 42 relative to each other, one of the aforementioned pair of support mechanisms 21 may be disposed directly below the inner shell dome 32 and the outer shell dome 42, and may be configured to support the inner shell main part 31 in a non-slidable manner. In this case, the other support mechanism 21 is configured to support the inner shell main part 31 such that the inner shell main part 31 is slidable in the axial direction of the tank 2.

Alternatively, in a case where a mechanism for fixing the inner shell dome 32 and the outer shell dome 42 is disposed between the inner shell dome 32 and the outer shell dome 42, both the support mechanisms 21 may be disposed at any positions, and may be configured to support the inner shell main part 31 such that the inner shell main part 31 is slidable in the axial direction of the tank 2.

In the present embodiment, as shown in FIG. 3, an annular blocking member 5 is disposed between the inner shell dome 32 and the outer shell dome 42. A first ring 51 protruding from the outer side surface of the inner shell dome 32 is provided on the outer side surface of the inner shell dome 32. A second ring 52 protruding from the inner side surface of the outer shell dome 42 is provided on the inner side surface of the outer shell dome 42. The blocking member 5 is disposed in a manner to bridge between the first ring 51 and the second ring 52. It should be noted that the blocking member 5, the first ring 51, and the second ring 52 are not shown in FIG. 1 and FIG. 2 for the purpose of simplifying the drawings.

In the present embodiment, the first ring 51 protrudes radially outward from the peripheral wall 32*a* of the inner shell dome 32, and the second ring 52 protrudes radially inward from the peripheral wall 42*a* of the outer shell dome 42.

The blocking member 5 divides the vacuum space 20 between the inner shell 3 and the outer shell 4 into a first space 20A and a second space 20B. The first space 20A includes a space between the inner shell manhole 30 and the outer shell manhole 40. The second space 20B is positioned at the inner shell main part 31 side. In the present embodiment, the blocking member 5 is disposed at the inner shell main part 31 side as seen from a position where the inner shell dome 32 and the outer shell dome 42 are penetrated by the pipes 13 (in the present embodiment, the blocking member 5 is disposed below the position). In the present embodiment, a bellows pipe 5A extending in the aforementioned particular direction defining the protruding direction of the inner shell dome 32 is used as the blocking member 5.

The first ring 51 and the second ring 52 are plate-shaped members, which are flattened in the aforementioned particular direction and which face each other in the particular direction. In the present embodiment, the first ring 51 is disposed under the blocking member 5, and the second ring 52 is disposed over the blocking member 5. One end (lower end) of the blocking member 5 is fixed to the upper surface of the first ring 51, and the other end (upper end) of the blocking member 5 is fixed to the lower surface of the second ring 52. However, as an alternative, the first ring 51 may be disposed over the blocking member 5, and the second ring 52 may be disposed under the blocking member 5.

In the double-shell tank 2 with the above-described configuration, the inner shell dome 32 is provided with the inner shell manhole 30, and the outer shell dome 42 is provided with the outer shell manhole 40. Accordingly, if the positions of the inner shell dome 32 and the outer shell dome 42 relative to each other are restricted, then the positions of the inner shell manhole 30 and the outer shell manhole 40 relative to each other are also restricted. Moreover, since such restriction can be realized at one position (e.g., one of the support mechanisms 21 or a fixing mechanism disposed between the inner shell dome 32 and the outer shell dome 42), thermal stress to the inner shell 3 can be prevented from occurring when thermal contraction of the inner shell 3 occurs. Furthermore, when the inner shell manhole 30 is opened, a part of the pipes 13, the part being positioned inside the inner shell dome 32, can be visually checked, and thereby regular inspection of the inside of the inner shell 3 can be performed efficiently.

Further, in the present embodiment, the vacuum space 20 between the inner shell 3 and the outer shell 4 is divided by the blocking member 5 into the first space 20A and the second space 20B. Accordingly, when the outer shell manhole 40 is opened, only the first space 20A, which is a small part of the vacuum space 20, becomes open to the atmosphere. Therefore, the volume of the space that needs to be made vacuum again after closing the outer shell manhole 40 can be reduced.

Still further, in the present embodiment, the blocking member 5 is disposed in a manner to bridge between the first ring 51 and the second ring 52. This allows the blocking member 5 to have a simple shape.

Other Embodiments

The present invention is not limited to the above-described embodiment. Various modifications can be made without departing from the spirit of the invention.

Figure 5:
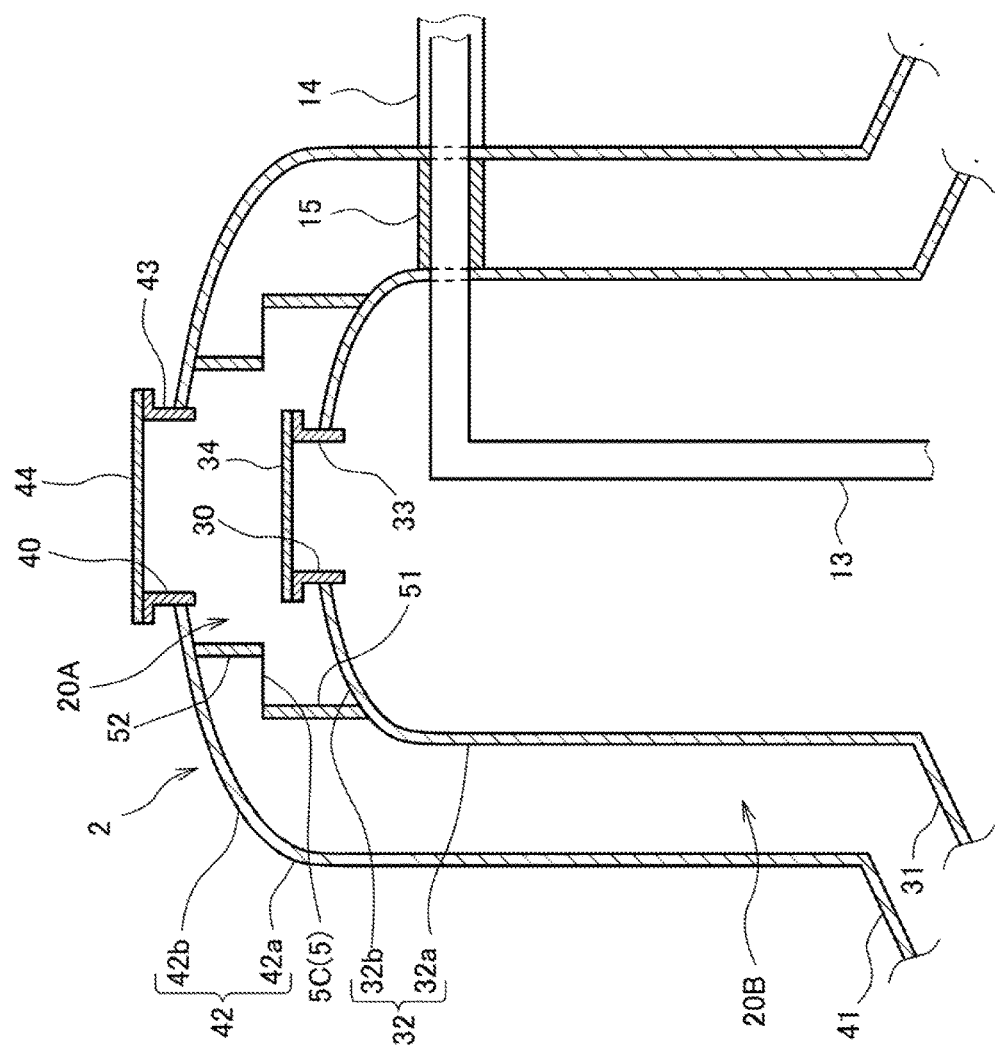
FIG. 5 is a sectional front view showing the double-shell tank of another variation.

For example, as shown in FIG. 5, the blocking member 5 may be disposed above the position where the inner shell dome 32 and the outer shell dome 42 are penetrated by the pipes 13 (e.g., between the ceiling wall 32b of the inner shell dome 32 and the ceiling wall 42b of the outer shell dome 42). In this case, however, even if the outer shell manhole 40 is opened, a part of the pipes 13, the part being positioned between the inner shell dome 32 and the outer shell dome 42, cannot be visually checked. On the other hand, as in the above-described embodiment, if the blocking member 5 is disposed at the inner shell main part 31 side as seen from the position where the inner shell dome 32 and the outer shell dome 42 are penetrated by the pipes 13, then the part of the pipes 13, which is positioned between the inner shell dome 32 and the outer shell dome 42, can be inspected when the outer shell manhole 40 is opened.

The blocking member 5 may be a straight pipe extending in the particular direction defining the protruding direction of the inner shell dome 32.

It is not essential for the annular blocking member 5 to be a member extending in the particular direction, and the blocking member 5 may have any shape, so long as the shape of the blocking member 5 has a central hole.

Figure 4:
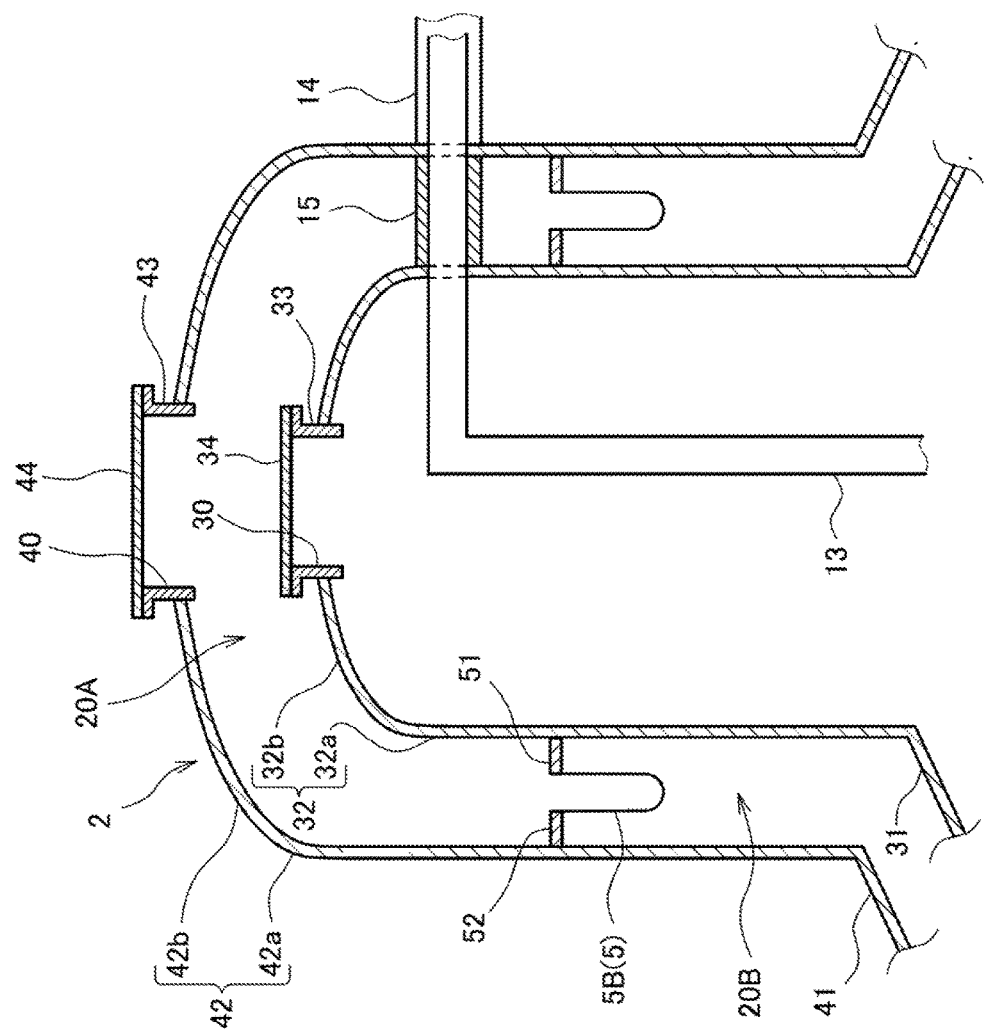
FIG. 4 is a sectional front view showing the double-shell tank of one variation.

For example, as shown in FIG. 4, the blocking member 5 may be a member 5B with a U-shaped cross section, which is open upward. Alternatively, as shown in FIG. 5, in a case where each of the first ring 51 and the second ring 52 has a tubular shape extending in the particular direction, the blocking member 5 may be a washer-like member 5C extending in the radial direction of the inner shell dome 32.

It is not essential for each of the first ring 51 and the second ring 52 to be a plate-shaped member that is flattened in the particular direction. For example, as shown in FIG. 5, each of the first ring 51 and the second ring 52 may be a tubular member whose axial direction is the particular direction.

INDUSTRIAL APPLICABILITY

The double-shell tank according to the present invention is useful not only as a tank to be mounted on a liquefied gas carrier ship but also as a tank to be installed on the ground.

REFERENCE SIGNS LIST 1 liquefied gas carrier ship
10 space
11 tank cover
12 outermost manhole
2 double-shell tank
20 vacuum space
20A first space
20B second space
3 inner shell
30 inner shell manhole
31 inner shell main part
32 inner shell dome
4 outer shell
40 outer shell manhole
41 outer shell main part
42 outer shell dome
5 blocking member
5A bellows pipe
51 first ring
52 second ring

The invention claimed is:

1. A horizontal type cylindrical double-shell tank comprising:
    an inner shell including an inner shell main part storing a liquefied gas and an inner shell dome, the inner shell main part including a cylindrical body portion that extends horizontally and sealing portions that seal openings on both sides of the body portion, the inner shell dome protruding from the body portion of the inner shell main part; and
    an outer shell forming a vacuum space between the inner shell and the outer shell, the outer shell including an outer shell main part surrounding the inner shell main part and an outer shell dome surrounding the inner shell dome, wherein
    the inner shell dome and the outer shell dome are penetrated by a pipe,
    the inner shell dome includes a first peripheral wall and a first ceiling wall, and the first ceiling wall is provided with an inner shell manhole,
    the outer shell dome includes a second peripheral wall and a second ceiling wall, and the second ceiling wall is provided with an outer shell manhole at a position corresponding to a position of the inner shell manhole.

2. The double-shell tank according to claim 1, comprising an annular blocking member disposed between the inner shell dome and the outer shell dome, the blocking member dividing the vacuum space into a first space and a second space, the first space including a space between the inner shell manhole and the outer shell manhole, the second space being positioned at the inner shell main part side.

3. The double-shell tank according to claim 2, wherein the blocking member is disposed at the inner shell main part side as seen from a position where the inner shell dome and the outer shell dome are penetrated by a pipe.

4. The double-shell tank according to claim 2, wherein an outer side surface of the inner shell dome is provided with a first ring protruding from the outer side surface,
    an inner side surface of the outer shell dome is provided with a second ring protruding from the inner side surface, and
    the blocking member is disposed in a manner to bridge between the first ring and the second ring.

5. The double-shell tank according to claim 4, wherein the first ring and the second ring are plate-shaped members, which are flattened in a particular direction, the particular direction defining a protruding direction of the inner shell dome, and which face each other in the particular direction, and the blocking member is a bellows pipe extending in the particular direction.

6. The double-shell tank according to claim 1, comprising a thermal-insulating material, which covers a part of the pipe penetrating the inner shell dome and the outer shell dome, the part being positioned between the inner shell dome and the outer shell dome.

7. A liquefied gas carrier ship comprising the double-shell tank according to claim 1.

8. The liquefied gas carrier ship according to claim 7, comprising a tank cover covering the double-shell tank, wherein an inert gas is enclosed in a space between the double-shell tank and the tank cover.

9. The liquefied gas carrier ship according to claim 8, wherein the tank cover is provided with an outermost manhole at a position corresponding to the position of the outer shell manhole.

\* \* \* \* \*